United States Patent
Chung et al.

(10) Patent No.: US 8,189,351 B2
(45) Date of Patent: May 29, 2012

(54) MULTI-INPUT DC/DC CONVERTERS WITH ZERO-CURRENT SWITCHING

(75) Inventors: Shu Hung Chung, Hong Kong Island (HK); Siu Wai Leung, Kowloon (HK); Kee Ming Chan, Yuen Long (HK)

(73) Assignee: Astec International Limited, Kwun Tong, Kowloon (HK)

( * ) Notice: Subject to any disclaimer, the term of this patent is extended or adjusted under 35 U.S.C. 154(b) by 578 days.

(21) Appl. No.: 11/710,683

(22) Filed: Feb. 23, 2007

(65) Prior Publication Data

US 2008/0205088 A1 Aug. 28, 2008

(51) Int. Cl.
*H02M 3/335* (2006.01)

(52) U.S. Cl. ......... 363/17; 363/21.02; 363/98; 363/132; 363/136

(58) Field of Classification Search ............... 363/15, 363/16, 17, 21.06, 49, 46.02, 56.02, 58, 98, 363/132, 21.02
See application file for complete search history.

(56) References Cited

U.S. PATENT DOCUMENTS

| | | | | |
|---|---|---|---|---|
| 5,315,498 A * | 5/1994 | Berrios et al. | | 363/98 |
| 5,684,683 A * | 11/1997 | Divan et al. | | 363/65 |
| 5,926,381 A * | 7/1999 | Moriguchi et al. | | 363/17 |
| 6,038,142 A | 3/2000 | Fraidlin et al. | | |
| 6,172,882 B1 * | 1/2001 | Tanaka et al. | | 363/17 |
| 6,587,356 B2 | 7/2003 | Zhu et al. | | |
| 6,898,093 B2 | 5/2005 | Ambo et al. | | |
| 7,420,825 B2 * | 9/2008 | Vinciarelli | | 363/65 |
| 7,548,435 B2 * | 6/2009 | Mao | | 363/16 |
| 2002/0136032 A1 * | 9/2002 | Zhang et al. | | 363/20 |
| 2005/0226012 A1 * | 10/2005 | Jovanovic et al. | | 363/59 |
| 2005/0243579 A1 * | 11/2005 | Jang et al. | | 363/16 |
| 2006/0114703 A1 * | 6/2006 | Price et al. | | 363/132 |

OTHER PUBLICATIONS

L. Solero, F. Caricchi, F. Crescimbini, O. Honorati, and F. Mezzetti, "Performance of a 10 kW power electronic interface for combined wind/PV isolated generating systems," in Proc. IEEE Power Electron. Spec. Conf., 1996, vol. 2, pp. 1027-1032.

B. Dobbs and P. Chapman, "A Multiple-Input DC-DC Converter Topology," *IEEE Power Electronics Letters*, vol. 1, No. 1, pp. 6-9, Mar. 2003.

H. Matsuo, T. Shigemizu, F. Kurokawa, and N. Watanabe, "Characteristics of the multiple-input DC-DC converter," in *Proc. IEEE Power Electron. Spec. Conf.*, Jun. 1993, pp. 115-120.

L. Solero, A. Lidozzi, and J. Pomilio, "Design of multiple-input power converter for hybrid vehicles," *IEEE Trans. Power Electron.*, vol. 20, No. 5, pp. 1007-1016, Sep. 2005.

(Continued)

*Primary Examiner* — Adolf Berhane
*Assistant Examiner* — Nguyen Tran
(74) *Attorney, Agent, or Firm* — Harness, Dickey & Pierce, P.L.C.

(57) ABSTRACT

A modular-based, zero-current-switched (ZCS), isolated full-bridge boost converter with multiple inputs is disclosed. Each converter module is used to match the connected input source and control the amount of power drawn from the source. The power from various sources are combined together and delivered to the load through a multiphase transformer. The input inductor of each boost-derived converter module keeps the input current constant and acts as a current source to drive the multiphase transformer through a phase-shifted-controlled full bridge converter. By connecting an auxiliary circuit across the full-bridge input in each module, the transformer leakage inductance and output capacitance of the switching devices are used to create resonant paths for facilitating zero-current-switching of all switching devices.

17 Claims, 6 Drawing Sheets

OTHER PUBLICATIONS

Y. Chen, Y. Liu, and F. Wu, "Multiple-input dc/dc converter based on the multiwinding transformer for renewable energy applications," *IEEE Trans. Industry Application*, vol. 38, No. 4, pp. 1096-1104, Jul./Aug. 2002.

K.K. Tse, H. Chung, S.Y.R. Hui, and M.T. Ho, "A novel maximum power point tracker for PV panels using switching frequency modulation," *IEEE Trans. Power Electron.*, vol. 17, No. 6, pp. 980-989, Nov. 2002.

R. Watson and F. C Lee, "A soft-switched, full-bridge boost converter employing an active-clamp circuit," in *Proc. IEEE Power Electron. Spec. Conf.*, 1996, pp. 1948-1954.

E. S. Park, S. J. Choi, M. Lee, B. H. Cho, "A soft-switching active-clamp scheme for isolated full-bridge boost converter," in *Proc. IEEE Appl. Power Electron. Conf.*, vol. 2, pp. 1067-1070, 2004.

V. Yakushev, S. Fraidlin, "Full bridge isolated current fed converter with active clamp," in *Proc. IEEE Appl. Power Electron. Conf.*, vol. 1, pp. 560-566, 1999.

B. Andreycak, "Phase shifted zero voltage transition design considerations and the UC3875 PWM controller," *Unitrode Handbook*, 1995-1996, pp. 10-334-347.

\* cited by examiner

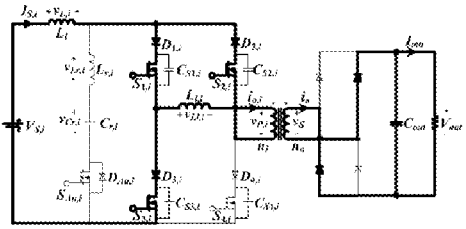
FIG. 5(a): Stage 1 $[t_0 - t_1]$
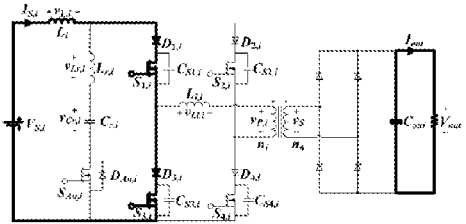
FIG. 5(b): Stage 2 $[t_1 - t_2]$
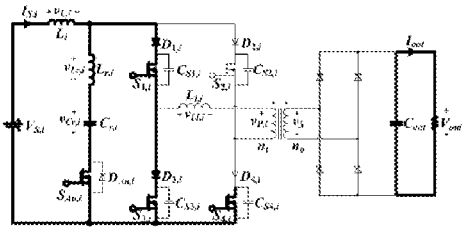
FIG. 5(c): Stage 3 $[t_2 - t_3]$
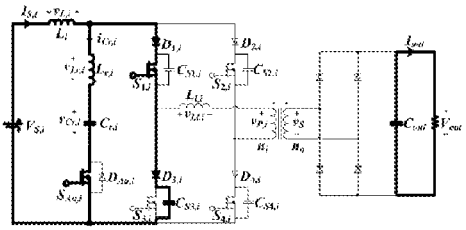
FIG. 5(d): Stage 4 $[t_3 - t_4]$
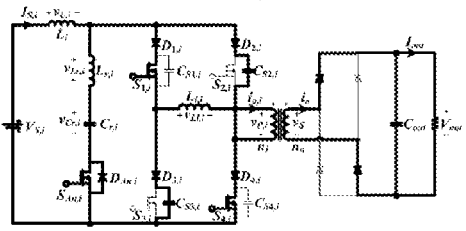
FIG. 5(e): Stage 5 $[t_4 - t_5]$
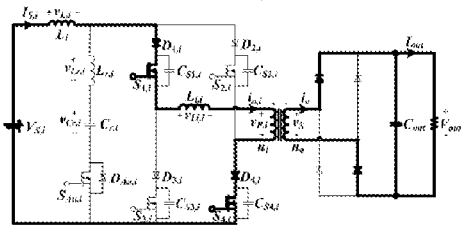
FIG. 5(f): Stage 6 $[t_5 - t_6]$
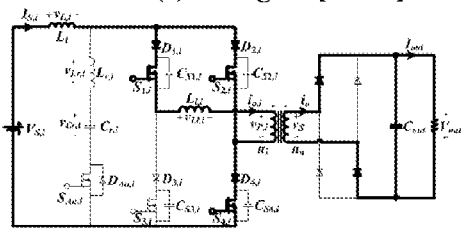
FIG. 5(g): Stage 7 $[t_6 - t_7]$
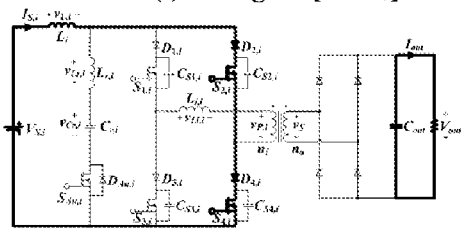
FIG. 5(h): Stage 8 $[t_7 - t_8]$
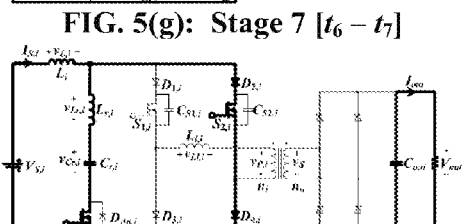
FIG. 5(i): Stage 9 $[t_8 - t_9]$
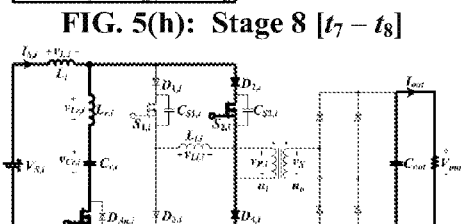
FIG. 5(j): Stage 10 $[t_9 - t_{10}]$

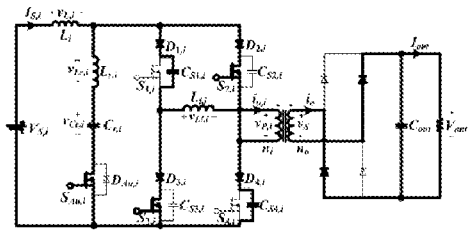
FIG. 5(k): Stage 11 [$t_{10} - t_{11}$]
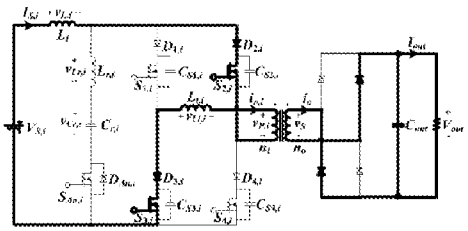
FIG. 5(l): Stage 12 [$t_{11} - t_{12}$]
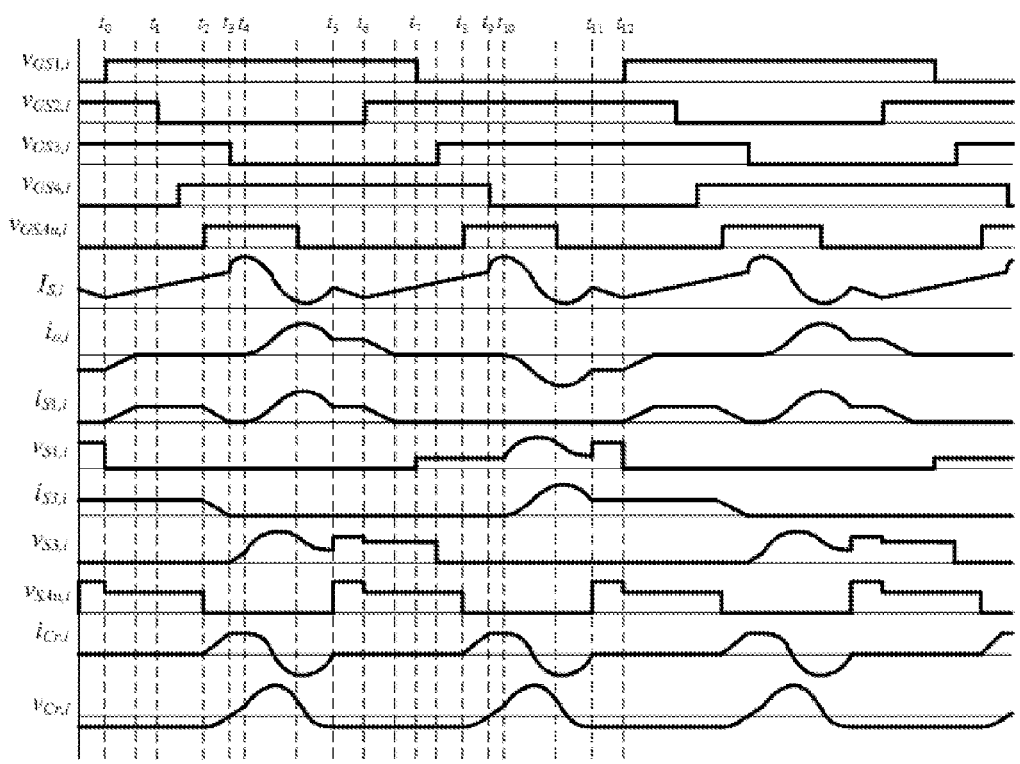
FIG. 6

US 8,189,351 B2

MULTI-INPUT DC/DC CONVERTERS WITH ZERO-CURRENT SWITCHING

FIELD

The present disclosure relates to multi-input (and single-input) DC/DC converters with zero-current-switching.

BACKGROUND

The statements in this section merely provide background information related to the present disclosure and may not constitute prior art.

Various DC/DC converters are known in the art for supplying dc power to loads, including multi-input DC/DC converters that can combine energy from multiple dc power input sources. Many of these converters incorporate full bridge converters having switches. Ideally, these switches would be turned on or off under zero-current conditions (so-called zero-current-switching) to minimize switching losses. Many existing converters are, however, incapable of achieving zero-current-switching of the main switches during both switching transitions. As a result, such converters suffer from switching losses that reduce the overall efficiency of the DC/DC converter.

SUMMARY

According to one example of the present disclosure, a multi-input dc/dc converter includes a plurality of input modules, a transformer, at least one output terminal for supplying dc power to a load, and a rectifier circuit. Each input module includes at least one input terminal for coupling to a dc power source and a full bridge converter having a plurality of main switches. The transformer has a plurality of primary windings and at least one secondary winding. Each primary winding is coupled to one of the full bridge converters. The rectifier circuit is coupled between the secondary winding of the transformer and the output terminal. Each input module further includes an auxiliary circuit coupled to the full bridge converter for achieving substantially zero-current-switching of the main switches during turn-on and turn-off of the main switches.

According to another example of the present disclosure, a multi-input DC/DC converter includes a plurality of input modules, a transformer having a plurality of primary windings and at least one secondary winding, at least one output terminal for supplying dc power to a load, and a rectifier circuit coupled between the secondary winding of the transformer and said output terminal. Each input module includes at least one input terminal for coupling to a dc power source, a full bridge converter having a plurality of main switches, and means for achieving substantially zero-current-switching of the main switches during turn-on and turn-off of the main switches. Each primary winding of the transformer is coupled to one of the full bridge converters.

According to a further example of the present disclosure, a DC/DC converter includes at least one input terminal for coupling to a dc power source, a full bridge converter having a plurality of main switches, a transformer having at least one primary winding coupled to the full bridge converter and at least one secondary winding, at least one output terminal for supplying dc power to a load, a rectifier circuit coupled between the secondary winding of the transformer and the output terminal, and an auxiliary circuit coupled between the input terminal and the full bridge converter for achieving substantially zero-current-switching of the main switches during turn-on and turn-off of the main switches.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 1:
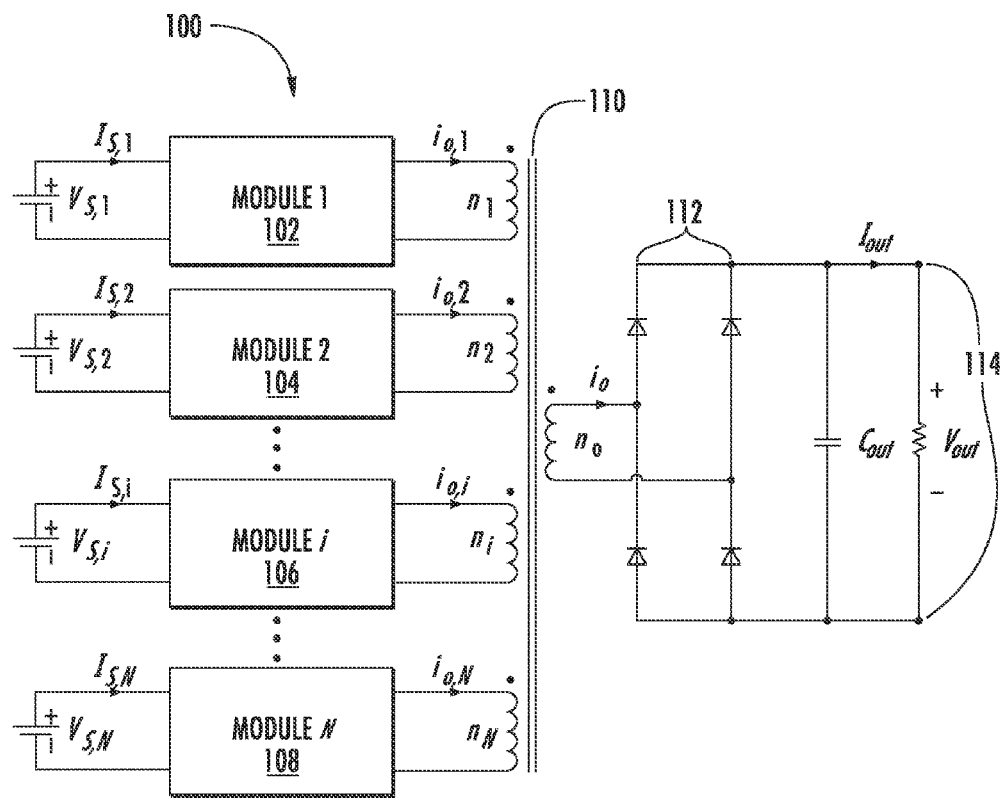
FIG. 1 is a block diagram of a multi-input DC/DC converter according to one example of the present disclosure.
Figure 3:
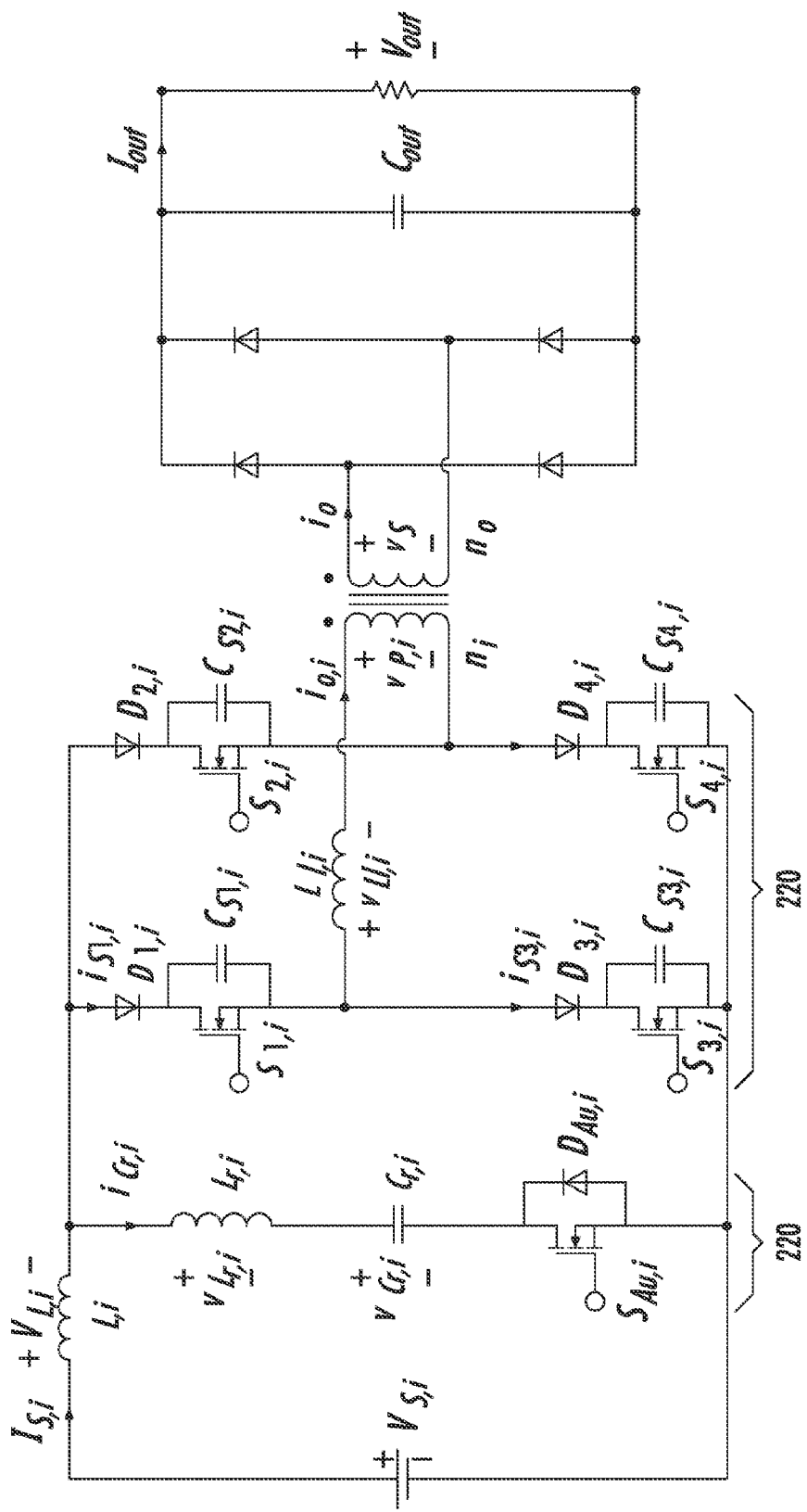
FIG. 3 is a circuit diagram of the ith input module shown in FIG. 1 according to one specific embodiment of this disclosure.

FIGS. 5(a)-5(l) illustrate the twelve operating stages of each input module shown in FIG. 1 and constructed according to the circuit diagram of FIG. 3.

FIG. 6 is a timing diagram for each input module shown in FIG. 1 and constructed according to the circuit diagram of FIG. 3.

Figure 7:
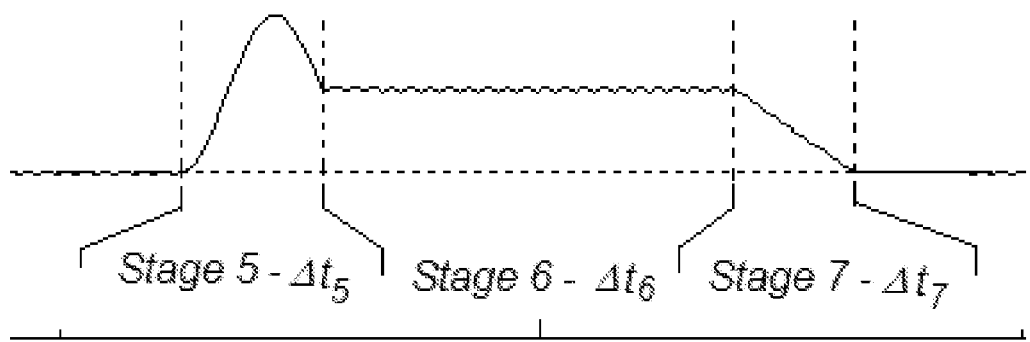

FIG. 7 illustrates the waveform of $i_{o,i}$ for determining a voltage conversion ratio.

Figure 8:
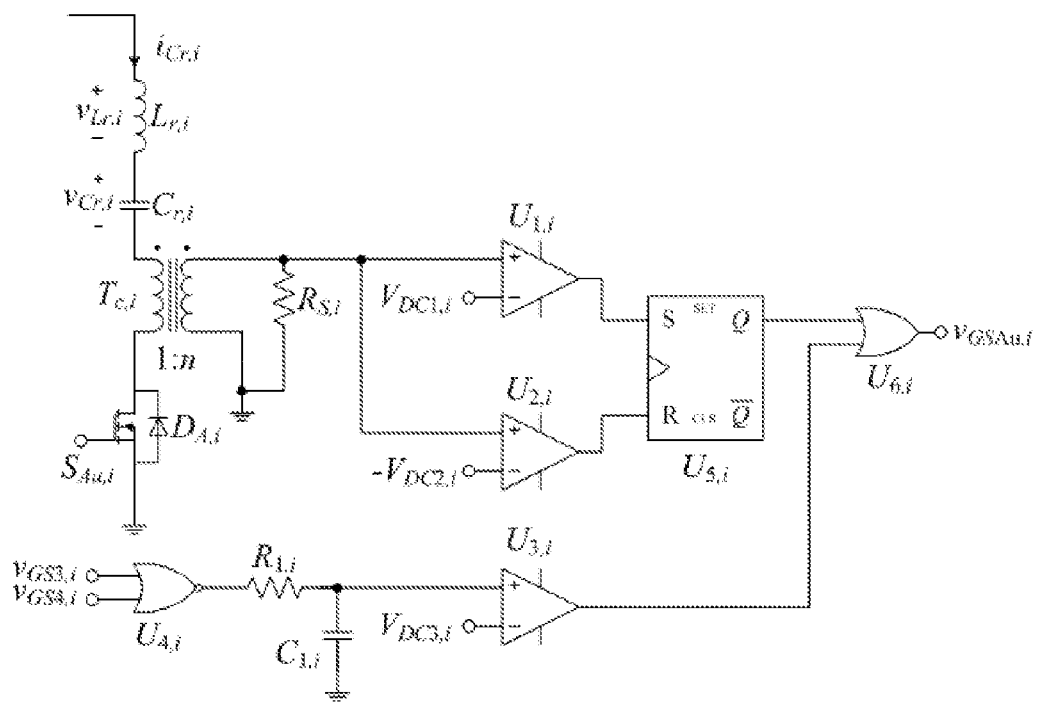

FIG. 8 illustrates a control circuit for the auxiliary circuit shown in FIG. 3 according to another example of the present disclosure.

DETAILED DESCRIPTION

The following description is merely exemplary in nature and is not intended to limit the present disclosure, application, or uses.

A multi-input DC/DC converter according to one example of the present disclosure is illustrated in FIG. 1 and indicated generally by reference number 100. As shown in FIG. 1, the converter 100 includes N input modules 102, 104, 106, 108, a transformer 110, a rectifier circuit 112, and output terminals 114 for supplying dc power to a load (N represents a positive integer greater than 1). Each input module 102-108 includes input terminals for coupling to a dc power source. Additionally, each input module 102-108 includes output terminals coupled to a primary winding $n_1$-$n_N$ of the transformer 110. The rectifier circuit 112 is coupled between a secondary winding $n_O$ of the transformer 110 and the converter output terminals 114, as shown in FIG. 1. In this manner, power from various dc power sources are combined together and delivered to the load through the transformer 110.

Figure 2:
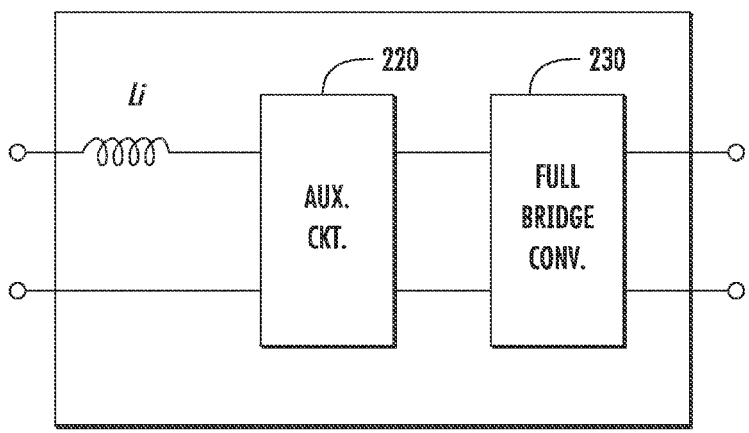
FIG. 2 is a block diagram of each input module shown in FIG. 1.

In the example of FIG. 1, each input module has the same general circuit configuration, which is illustrated in FIG. 2. Accordingly, the example of FIG. 1 is a modular-based multi-input DC/DC converter. As shown in FIG. 2, each input module includes an input choke $L_i$, an auxiliary circuit 220, and a full bridge converter 230. The auxiliary circuit 220 is coupled between the input choke $L_i$ and the full bridge converter 230. As further explained below, the auxiliary circuit is configured for achieving substantially zero current switching (ZCS) (also referred to as "soft-switching") of the converter's main switches during turn-on and turn-off of such switches. The auxiliary circuit essentially converts the hard-switched isolated boost converter (the main switches of the full bridge converter) into a soft-switched isolated boost converter. The auxiliary circuit does this without significantly affecting the macro-operation of the multi-input converter 100. As a result, the converter of FIG. 1 has reduced losses and thus improved efficiency (on the order of 6-8%) as compared to prior art multi-input DC/DC converters.

FIG. 3 illustrates one specific embodiment of the auxiliary circuit and full bridge converter shown in FIG. 2. More specifically, FIG. 3 illustrates the equivalent circuit for a specific embodiment of the ith input module 106 shown in FIG. 1. In the embodiment of FIG. 3, the auxiliary circuit 220 includes an auxiliary inductor $L_{r,i}$, an auxiliary capacitor $C_{r,i}$ and an auxiliary switch $S_{Au,i}$ coupled in series. The auxiliary switch includes a body diode $D_{Au,i}$ that inhibits current flow from the input choke $L_i$ when the auxiliary switch is off. Further, the full bridge converter 230 is a phase-shift-controlled full bridge converter having four main MOSFET switches $S_{1,i}$-$S_{4,i}$ each configured for unidirectional operation. In the specific embodiment of FIG. 3, the main switches are configured for unidirectional operation by coupling the switch in series with blocking diodes $D_{1,i}$-$D_{4,i}$.

The auxiliary circuit forms a quasi-resonant circuit—with the transformer leakage inductance and the output capacitances of main switches—that facilitates zero-current-switching of the main switches in the full bridge converter. During the stages that power is transferred to the output side of the converter, the resonant time is only three quarters of the resonant period. Therefore, the auxiliary circuit is called a quasi-resonant circuit.

The low side switches $S_{3,i}$-$S_{4,i}$ of the full-bridge converter achieve zero-current switching during turn-off due to the resonance of the auxiliary capacitor and the auxiliary inductor. The current starts from zero, resonates to a peak value and returns to a level equal to the input current. The current then remains at such level until the power transferring stage ends. The low side switches also achieve zero-current switching during turn-on due to the auxiliary capacitor, the auxiliary inductor and the leakage inductance of the transformer. The high side switches $S_{1,i}$-$S_{2,i}$ of the full-bridge converter also turn-on and turn-off with zero current due to the transformer winding current reset. Accordingly, the switching losses in the full-bridge converter are quite low.

Further, the auxiliary switch achieves zero-current switching during turn-on due to the resonance of the auxiliary capacitor and the auxiliary inductor. The auxiliary switch also achieves zero-voltage switching during turn-off due to the resonance of the auxiliary capacitor, the auxiliary inductor and the leakage inductance of the transformer. Thus, soft-switching of the auxiliary switch can be achieved during both switching transitions (turn-on and turn-off). Accordingly, the switching losses in the auxiliary circuit are also quite low.

One example of a suitable phase-shift controller for each full-bridge converter is the UC3875 integrated circuit available from Texas Instruments Incorporated. This circuit includes a bi-directional synchronization (CLOCKSYNC) pin. This pin of several ICs (one for each full-bridge converter) can be connected together so that the gate signal will be synchronized by the IC with the fastest local oscillating frequency. In this manner, the gate signals of the high side switches are synchronized for all modules. The phase shift of the low side switches is determined by the feedback circuit of the phase-shift controller.

Each auxiliary circuit can be controlled by a control circuit that operates independently in each module. In other words, the control circuits for the auxiliary circuits need not be synchronized. Each control circuit can include a current transformer for sensing the current in the auxiliary circuit. The turn-on time of the auxiliary switch is pre-set depending on the auxiliary capacitor and the auxiliary inductor values. The auxiliary switch can be turned-off any time that its body diode is conducting.

Figure 4:
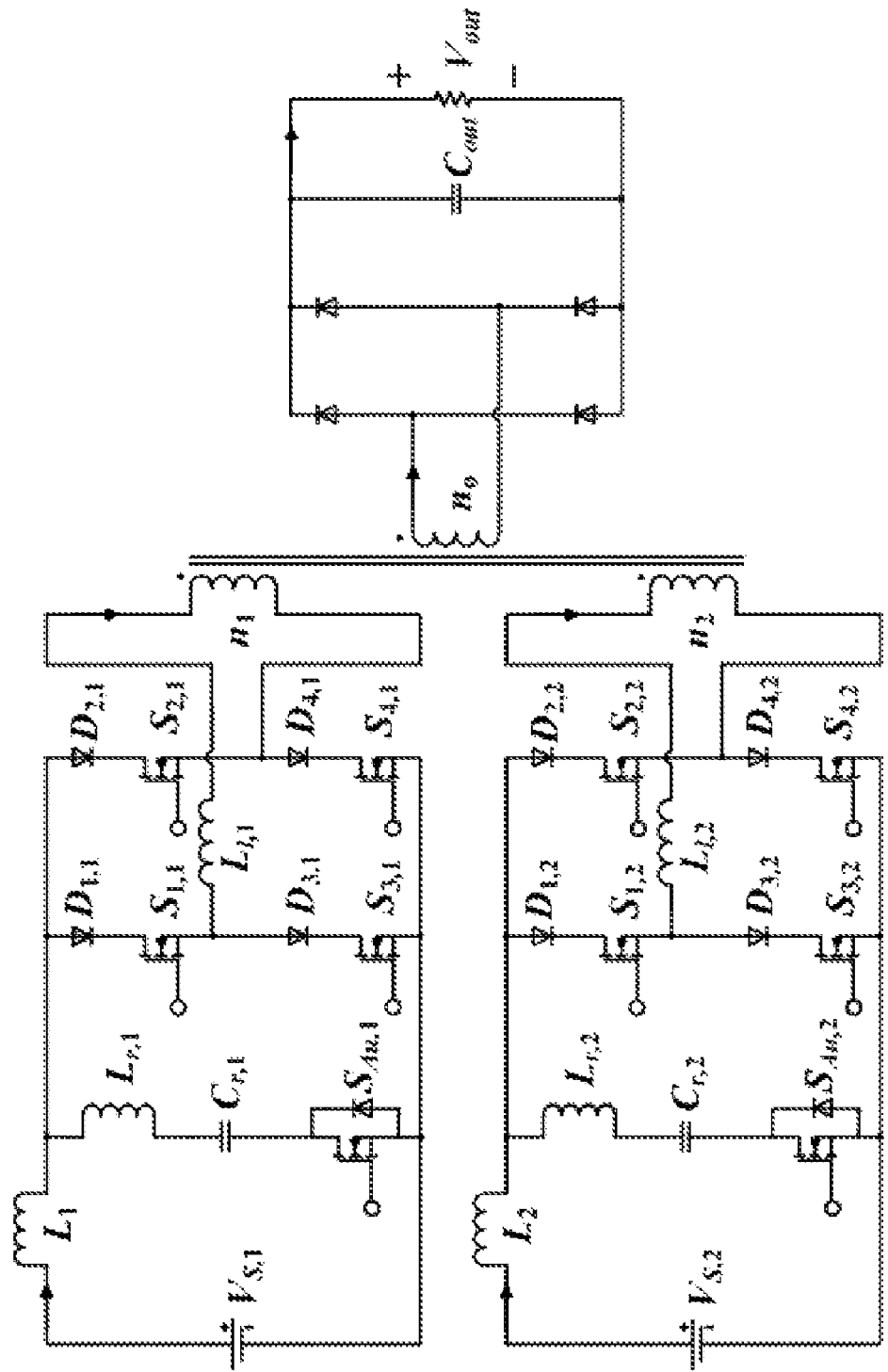
FIG. 4 is a circuit diagram of a two-input DC/DC converter according to another example of the present disclosure.

Although FIG. 1 illustrates a DC/DC converter with four input modules, it should be understood that the DC/DC converter can have more or less input modules without departing from the teachings of this disclosure. For example, FIG. 4 illustrates a multi-input DC/DC converter having only two input modules. Further, while multi-input DC/DC converters are described above, it should be understood that the teachings of present disclosure also apply to single input DC/DC converters (having only one dc power source). For example, the circuit illustrated in FIG. 3 can be used by itself as a single input DC/DC converter (having only one input module i).

The operating principles for one specific embodiment of the converter of FIG. 1—where each input module includes an auxiliary circuit and a full-bridge converter as shown in FIG. 3—will now be described. Each module goes through twelve operating stages in one switching cycle. These operating stages are described further below, and are illustrated in FIGS. 5A-5L. FIG. 6 illustrates the timing diagram for each module. The switches $S_{1,i}$ and $S_{2,i}$ are synchronized with the other modules, while the switches $S_{3,i}$ and $S_{4,i}$ are independently controlled for determining the input-to-output voltage requirement. The auxiliary circuit formed by the switch $S_{Au,i}$, resonant inductor $L_{r,i}$, and resonant capacitor $C_{r,i}$ is used to provide ZCS conditions for all switches.

To simplify the analysis below, the following assumptions have been made: (i) the transistors and diodes are perfect; they have zero on-state resistance, infinite off-state resistance, and zero junction capacitance; (ii) all the energy storage components are free of loss without parasitic element; and (iii) the operations of the switch pair $S_{1,i}$ and $S_{2,i}$, and the switch pair $S_{3,i}$ and $S_{4,i}$, are similar; the magnitude of the output voltage is controlled by adjusting the phase shift between the two switch pairs.

Stage 1 [$t_0$-$t_1$] [FIG. 5(a)]: Transformer Current Reset Stage

A closed path formed by the transformer, transformer leakage inductance $L_{l,i}$, $S_{1,i}$, and $S_{2,i}$ is created. The output voltage $V_{out}$ reflected to the transformer primary side is applied across $L_{l,i}$ and makes the transformer primary current decrease. $S_{2,i}$ is then turned off with zero current at the end of this stage. The input inductor $L_i$ is charged by the supply source $v_{S,i}$. The equations of this stage are $$i_{S,i} = \frac{v_{S,i}}{L_i}t + I_{L12,i}, \; i_{Cr,i} = 0, \; i_{S1,i} = \left(\frac{v_{S,i}L_{l,i} + v_{P,i}L_i}{L_i L_{l,i}}\right)t,$$

$$i_{S2,i} = -\left(\frac{v_{P,i}}{L_{l,i}}t\right) + I_{L12,i}$$

$$i_{S3,i} = \frac{v_{S,i}}{L_i}t + I_{L12,i}, \; i_{S4,i} = 0 \quad (2)$$

$$v_{Cr,i} = V_{C0,i}, \; v_{S1,i} = v_{S2,i} = v_{S3,i} = 0 \quad (3)$$

where $I_{L12,i}$ is the input current at the end of the last cycle, $$v_{P,i} = \frac{n_i}{n_o}V_{out}$$

is the output voltage reflected to the primary side of the transformer, and $V_{C0,i}$ is the voltage across $C_{r,i}$ at the end of stage 12 and is also equal to the value at the end of stage 11.

The duration of this stage is $\Delta t_{1,i}=t_1-t_0$. The gate signals that apply to the two high side switches $S_{1,i}$ and $S_{2,i}$ are overlapped. The duration of this stage is $\Delta t_{1,i}=t_1-t_0$. The gate signals that apply to the two high side switches $S_{1,i}$ and $S_{2,i}$ are overlapped 2) Stage 2 [$t_1$-$t_2$] [FIG. 5(b)]: Inductor Charging Stage $L_i$ is continually charged by $v_{S,i}$ through the switches $S_{1,i}$ and $S_{3,i}$. The equations of this stage are $$i_{S,i} = \frac{v_{S,i}}{L_i}t + I_{L1,i}, \; i_{S1,i} = i_{S3,i} = \frac{v_{S,i}}{L_i}t + I_{L1,i}, \tag{4}$$

$$i_{Cr,i} = 0, \; i_{S2,i} = i_{S4,i} = 0$$

$$v_{Cr,i} = V_{C0,i}, \; v_{S1,i} = v_{S3,i} = 0 \tag{5}$$

where $I_{L1,i}$ is the value of $i_{S,i}$ at $t_1$.

The duration of this stage is $\Delta t_{2,i}$. It determines the average current through $L_i$ and the magnitude of $V_{out}$.

3) Stage 3 [$t_2$-$t_3$] [FIG. 5(c)]: Resonant Stage I $S_{Au,i}$ and $S_{4,i}$ are turned on with zero current. $C_{r,i}$, $L_{r,i}$, $S_{1,i}$, and $S_{3,i}$ form a resonant path. The energy stored in $C_{r,i}$ will generate a resonant current that will make the current through $S_{1,i}$ and $S_{3,i}$ zero. The stage ends when $S_{3,i}$ is turned off with zero current and zero voltage. $i_{Cr,i}$ will reach to the value equal to $i_{S,i}$. The equations of this stage are $$i_{S,i} = \frac{v_{S,i}}{L_i}t + I_{L2,i}, \; i_{S1,i} = i_{S3,i} = \frac{v_{S,i}}{L_i}t + \frac{V_{C0,i}}{Z_{o3,i}}\sin\omega_{3,i}t + I_{L2,i},$$

$$i_{S2,i} = i_{S4,i} = 0$$

$$i_{Cr,i} = -\frac{V_{C0,i}}{Z_{o3,i}}\sin\omega_{3,i}t \tag{6}$$

$$v_{Cr,i} = V_{C0,i}\cos\omega_{3,i}t, \; v_{S1,i} = v_{S3,i} = v_{S4,i} = 0 \tag{7}$$

where $I_{L2,i}$ is the value of $i_{S,i}$ at $t_2$, $$\omega_{3,i} = \frac{1}{\sqrt{L_{r,i}C_{r,i}}}, \; \text{and} \; Z_{o3,i} = \sqrt{\frac{L_{r,i}}{C_{r,i}}}.$$

The duration of this stage, $\Delta t_{3,i} = t_3 - t_2$, is determined by solving (5) and (6) that $$\frac{-V_{C0,i}}{Z_{o3,i}}\sin\omega_{3,i}\Delta t_{3,i} = \frac{v_{S,i}}{L_i}\Delta t_{3,i} + I_{L2,i} \tag{8}$$

The voltage of $v_{Cr,i}$ at $t_3$ is determined by solving (6) and (7), $$v_{Cr,i}(t_3) = V_{C1,i} = V_{C0,i}\cos\omega_{3,i}\Delta t_{3,i} \tag{9}$$

4) Stage 4 [$t_3$-$t_4$] [FIG. 5(d)]: Capacitor Constant Current Charging Stage

As the duration of this stage is short and the input current has small variation, $L_i$ is considered as a constant current in this stage. The junction capacitance of $S_{3,i}$, $C_{S3,i}$, and $C_{r,i}$ undergo constant current charging. This stage ends when the two capacitor voltages increase to the level equal to the output voltage reflected to the primary side of the transformer. The equations of this stage are $$i_{S,i} = \frac{v_{S,i} - V_{C1,i}}{Z_{o4,i}}\sin\omega_{4,i}t + I_{L3,i}\cos\omega_{4,i}t, \tag{10}$$

$$i_{Cr,i} = i_{SAu,i}$$
$$= \frac{C_{r,i}}{C_{r,i} + C_{S3,i}}\left[\frac{v_{S,i} - V_{C1,i}}{Z_{o4,i}}\sin\omega_{4,i}t + I_{L3,i}\cos\omega_{4,i}t\right]$$
$$\approx i_{S,i},$$

$$i_{S3,i} = \frac{C_{S3,i}}{C_{r,i} + C_{S3,i}}\left[\frac{v_{S,i} - V_{C1,i}}{Z_{o4,i}}\sin\omega_{4,i}t + I_{L3,i}\cos\omega_{4,i}t\right]$$
$$\approx 0,$$

$$i_{S1,i} = i_{S2,i}$$
$$= i_{S4,i}$$
$$= 0$$

-continued $$v_{Cr,i} = v_{S,i} - (v_{S,i} - V_{C1,i})\cos\omega_{4,i}t + Z_{o4,i}I_{L3,i}\sin\omega_{4,i}t \tag{11}$$
$$\approx \frac{i_{S,i}}{C_{r,i} + C_{S3,i}}t + V_{C1,i},$$

$$v_{S1,i} = v_{S4,i} = 0$$

where $I_{L3,i}$ is the input current at $t_3$, $$\omega_{4,i} = \frac{1}{\sqrt{L_i(C_{r,i} + C_{S3,i})}}, \; \text{and} \; Z_{o4,i} = \sqrt{\frac{L_i}{C_{r,i} + C_{S3,i}}}.$$

The duration of this stage, $\Delta t_{4,i} = t_4 - t_3$, is obtained by using (10) that $$v_{P,i} - v_{S,i} = -(v_{S,i} - V_{C1,i})\cos\omega_{4,i}\Delta t_{4,i} + Z_{o4,i}I_{L3,i}\sin\omega_{4,i}\Delta t_{4,i} \tag{12}$$

5) Stage 5 [$t_4$-$t_5$] [FIG. 5(e)]: Resonant Stage II $S_{4,i}$ starts conducting. $C_{r,i}$, $L_{r,i}$, $S_{1,i}$, $S_{4,i}$, the output capacitances of $S_{2,i}$ and $S_{3,i}$, $C_{S2,i}$ and $C_{S3,i}$, and the leakage inductance of the transformer $L_{l,i}$ form a resonant circuit. $S_{Au,i}$ will be turned off with zero current and zero voltage, when the diode $D_{Au,i}$ conducts. This stage ends when $D_{Au,i}$ turns off with zero current.

$$i_{S,i} = \frac{(v_{S,i} - v_{P,i})C_{r,i}L_{l,i}^2}{(L_i + L_{l,i})\sqrt{C_{r,i}\Phi_i(L_i + L_{l,i})}}\sin\omega_{5,i}t + \tag{13}$$
$$\frac{L_{l,i}I_{LA,i}}{L_i + L_{l,i}}\cos\omega_{5,i}t - \frac{v_{P,i} - v_{S,i}}{L_i + L_{l,i}}t + \frac{L_iI_{LA,i}}{L_i + L_{l,i}},$$

$$i_{Cr,i} = \frac{(v_{S,i} - v_{P,i})L_{l,i}C_{r,i}}{\sqrt{C_{r,i}\Phi_i(L_i + L_{l,i})}}\sin\omega_{5,i}t + I_{LA,i}\cos\omega_{5,i}t,$$

$$i_{S1,i} = i_{S4,i}$$
$$= \frac{(v_{P,i} - v_{S,i})C_{r,i}L_iL_{l,i}}{(L_i + L_{l,i})\sqrt{C_{r,i}\Phi_i(L_i + L_{l,i})}}\sin\omega_{5,i}t -$$
$$\frac{L_iI_{LA,i}}{L_i + L_{l,i}}\cos\omega_{5,i}t - \frac{v_{P,i} - v_{S,i}}{L_i + L_{l,i}}t + \frac{L_iI_{LA,i}}{L_i + L_{l,i}},$$

$$i_{S2,i} = i_{S3,i} = 0$$

$$v_{Cr,i} = I_{LA,i}Z_{o5,i}\sin\omega_{5,i}t - \frac{(v_{S,i} - v_{P,i})L_{l,i}}{L_i + L_{l,i}}\cos\omega_{5,i}t + \frac{L_iv_{P,i} + L_{l,i}v_{S,i}}{L_i + L_{l,i}}, \tag{14}$$

$$v_{S1,i} = v_{S4,i} = 0,$$

$$v_{S2,i} = v_{S3,i}$$
$$= \frac{(v_{P,i} - v_{S,i})L_iL_{l,i}^2}{(L_i + L_{l,i})\Phi_i}\cos\omega_{5,i}t +$$
$$\frac{L_iL_{l,i}I_{LA,i}}{\sqrt{C_{r,i}\Phi_i(L_i + L_{l,i})}}\sin\omega_{5,i}t + \frac{v_{S,i}L_{l,i} + v_{P,i}L_i}{L_i + L_{l,i}}$$

where $I_{L4,i}$ is the input current at $t_4$, $$\omega_{5,i} = \sqrt{\frac{L_i + L_{l,i}}{C_{r,i}\Phi_i}}, \; Z_{o5,i} = \sqrt{\frac{\Phi_i}{C_{r,i}(L_i + L_{l,i})}}$$

and $\Phi_i = L_{r,i}L_i + L_{r,i}L_{l,i} + L_iL_{l,i}$.

The duration of this stage $\Delta t_{5,i}$ is obtained by solving $i_{Cr,i}=0$ in (13) that $$\Delta t_{5,i} = t_5 - t_4 = \frac{1}{\omega_{4,i}}\tan^{-1}\frac{I_{LA,i}\sqrt{C_{r,i}\Phi_i(L_i+L_{l,i})}}{(v_{P,i}-v_{S,i})L_{l,i}C_{r,i}} \approx \frac{3\pi}{2}\frac{1}{\omega_{5,i}} \quad (15)$$

At the end of this stage, $v_{Cr,i}=V_{C5,i}$ and is determined by using (14) and (15).

$$v_{Cr,i}(t_5) = V_{C0,i} = -I_{LA,i}Z_{o5,i} + \frac{L_i v_{P,i} + L_{l,i} v_{S,i}}{L_i + L_{l,i}} \quad (16)$$

The maximum voltage and current rating of the main switches, $v_{S2(max),i}$, $v_{S3(max),i}$, $i_{S1(max),i}$, and $i_{S4(max),i}$, can be obtained by solving (13) and (14), respectively.

$$v_{S2(max),i} = v_{S3(max),i} = \frac{L_i L_{l,i} I_{LA,i}}{\sqrt{C_{r,i}\Phi_i(L_i+L_{l,i})}} + \frac{v_{S,i}L_{l,i}+v_{P,i}L_i}{L_i+L_{l,i}} \quad (17)$$

and $$i_{S1(max),i} = i_{S4(max),i} \quad (18)$$
$$= \frac{(v_{P,i}-v_{S,i})C_{r,i}L_iL_{l,i}}{(L_i+L_{l,i})\sqrt{C_{r,i}\Phi_i(L_i+L_{l,i})}} -$$
$$\frac{v_{P,i}-v_{S,i}}{L_i+L_{l,i}}\left(\frac{\pi}{2\omega_{5,i}}\right) + \frac{L_i}{L_i+L_{l,i}}I_{LA,i}$$

6) Stage 6 [$t_5$-$t_6$] [FIG. 5(f)]: Inductor Discharging Stage

The energy stored in $L_i$ releases to the output together with the input at a relatively constant current. This stage ends when $S_{2,i}$ is turned on with zero current.

$$i_{S,i} = \frac{v_{S,i}-v_{P,i}}{L_i}t + I_{L5,i}, \quad (19)$$
$$i_{Cr,i} = 0,$$
$$i_{S1,i} = i_{S4,i} = \frac{v_{S,i}-v_{P,i}}{L_i}t + I_{L5,i},$$
$$i_{S2,i} = i_{S3,i} = 0$$
$$v_{Cr,i} = V_{C0,i}, v_{S1,i} = v_{S4,i} = 0 \quad (20)$$

where $I_{L5,i}$ is the input current at $t_5$.

The duration of this stage $\Delta t_{6,i}$ is equal to $$\Delta t_{6,i} = t_6 - t_5 = \left(\theta_i\frac{T_S}{2}\right) - \left(\frac{3\pi}{2}\frac{1}{\omega_{5,i}}\right) \quad (21)$$

where $\theta_i = t_6 - t_4$.

As shown in FIG. 6, $\theta_i$ is approximately equal to the phase shift between the switch pairs of $S_{1,i}$-$S_{2,i}$ and $S_{3,i}$-$S_{4,i}$, as the duration of stage 4 is short.

7) Stage 7 [$t_6$-$t_7$] [FIG. 5(g)]: Transformer Current Reset Stage

This stage is similar to stage 1. The reflected voltage of $V_{out}$ on the primary side is applied across $L_{l,I}$ through $S_{1,i}$ and $S_{2,i}$. This makes the transformer primary current decrease linearly. $S_{1,i}$ is turned off with zero current before the end of this stage. The input inductor $L_i$ is charged by the supply source $v_{S,i}$. The equations of this stage are $$i_{S,i} = \frac{v_{S,i}}{L_i}t + I_{L6,i}, \quad (22)$$
$$i_{Cr,i} = 0,$$
$$i_{S1,i} = -\frac{v_{P,i}}{L_{l,i}}t + I_{L6,i},$$
$$i_{S2,i} = \frac{v_{S,i}L_{l,i}+v_{P,i}L_i}{L_iL_{l,i}}t$$
$$i_{S3,i} = 0,$$
$$i_{S4,i} = \frac{v_{S,i}}{L_i}t + I_{L6,i}$$

$$v_{Cr,i} = V_{C0,i}, \quad (23)$$
$$v_{S1,i} = v_{S2,i} = v_{S4,i} = 0$$

where $I_{L6,i}$ is the input current at $t_6$.

The duration of this stage is $\Delta t_{7,i}=t_7-t_6$. The gate signals that apply to the two high side switches $S_{1,i}$ and $S_{2,i}$ are overlapped.

8) Stage 8 [$t_7$-$t_8$] [FIG. 5(h)]: Inductor Charging Stage $L_i$ is continually charged by $v_{S,i}$ through the switches $S_{2,i}$ and $S_{4,i}$. The equations of this stage are $$i_{S,i} = \frac{v_{S,i}}{L_i}t + I_{L7,i}, \quad (24)$$
$$i_{S1,i} = i_{S3,i} = 0,$$
$$i_{S2,i} = i_{S4,i} = \frac{v_{S,i}}{L_i}t + I_{L7,i},$$
$$i_{Cr,i} = 0$$

$$v_{Cr,i} = V_{C0,i}, \quad (25)$$
$$v_{S1,i} = v_{S3,i} = 0$$

where $I_{L7,i}$ is the input current at $t_7$.

The duration of this stage is $\Delta t_{8,i}$. Similar to stage 2, it determines the average current through $L_i$ and the magnitude of $V_{out}$.

9) Stage 9 [$t_8$-$t_9$] [FIG. 5(i)]: Resonant Stage I $S_{Au,i}$ and $S_{3,i}$ are turned on with zero current. $C_{r,i}$, $L_{r,i}$, $S_{2,i}$, and $S_{4,i}$ form a resonant path. The energy stored in $C_{r,i}$ will generate a resonant current that will make the current through $S_{2,i}$ and $S_{4,i}$ zero. The stage ends when $S_{4,i}$ is turned off with zero current and zero voltage. $i_{Cr,i}$ will reach to the value equal to $i_{S,i}$. The equations of this stage are $$i_{S,i} = \frac{v_{S,i}}{L_i}t + I_{L8,i}, \quad (26)$$
$$i_{S1,i} = i_{S3,i} = 0,$$
$$i_{S2,i} = i_{S4,i} = \frac{v_{S,i}}{L_i}t + \frac{V_{C0,i}}{Z_{o9,i}}\sin\omega_{9,i}t + I_{L8,i}$$
$$i_{Cr,i} = -\frac{V_{C0,i}}{Z_{o9,i}}\sin\omega_{9,i}t$$

$$v_{Cr,i} = V_{C0,i}\cos\omega_{9,i}t, \quad (27)$$
$$v_{S2,i} = v_{S3,i} = v_{S4,i} = 0$$

where $I_{L8,i}$ is the value of $i_{S,i}$ at $t_1$, $\omega_{9,i}=\omega_{3,i}$ and $Z_{o9,i}=Z_{o3,i}$.

The duration of this stage, $\Delta t_{9,i}=t_9-t_8$, is determined by solving (26) and (27) that $$\frac{-V_{C0,i}}{Z_{o9,i}}\sin\omega_{9,i}\Delta t_{9,i} = \frac{v_{S,i}}{L_i}\Delta t_{9,i} + I_{L8,i} \quad (28)$$

The value of $\Delta t_{9,i}$ is equal to $\Delta t_{3,i}$.

10) Stage 10 [$t_9$-$t_{10}$] [FIG. 5(j)]: Resonant Capacitor Constant Current Charging Stage Similar to Stage 4, the junction capacitance of $S_{4,i}$, $C_{S4,i}$, and $C_{r,i}$ undergo constant current charging. This stage ends when the capacitor voltages increase to the level equal to the output voltage reflected to the primary side of the transformer. The equations of this stage are $$i_{S,i} = \frac{v_{S,i} - V_{C1,i}}{Z_{o10,i}} \sin\omega_{10,i}t + I_{L9,i}\cos\omega_{10,i}t, \quad (29)$$

$$i_{Cr,i} = i_{SAu,i}$$
$$= \frac{C_{r,i}}{C_{r,i} + C_{S4,i}}\left[\frac{v_{S,i} - V_{C1,i}}{Z_{o10,i}}\sin\omega_{10,i}t + I_{L9,i}\cos\omega_{10,i}t\right]$$
$$\approx i_{S,i},$$

$$i_{S1,i} = i_{S2,i} = i_{S3,i} = 0,$$

$$i_{S4,i} = \frac{C_{S4,i}}{C_{r,i} + C_{S4,i}}\left[\frac{v_{S,i} - V_{C1,i}}{Z_{o10,i}}\sin\omega_{10,i}t + I_{L9,i}\cos\omega_{10,i}t\right] \approx 0$$

$$v_{Cr,i} = v_{S,i} - (v_{S,i} - V_{C1,i})\cos\omega_{10,i}t + Z_{o10,i}I_{L9,i}\sin\omega_{10,i}t \quad (30)$$
$$\approx \frac{i_{S,i}}{C_{r,i} + C_{S4,i}}t + V_{C1,i},$$

$$v_{S2,i} = v_{S3,i} = 0$$

where $I_{L9,i}$ is the input current at $t_9$, $\omega_{10,i}=\omega_{4,i}$ and $Z_{o10,i}=Z_{o4,i}$.

The duration of this stage, $\Delta t_{10,i}=t_{10}-t_9$, is obtained by solving (30) that $$v_{P,i}-v_{S,i}=-(v_{S,i}-V_{C1,i})\cos\omega_{10,i}\Delta t_{10,i}+Z_{o10,i}I_{L9,i}\sin\omega_{10,i}\Delta t_{10,i} \quad (31)$$

11) Stage 11 [$t_{10}$-$t_{11}$] [FIG. 5(k)]: Resonant Stage II $S_{3,i}$ starts conducting. $C_{r,i}$, $L_{r,i}$, $S_{2,i}$, $S_{3,i}$, the output capacitances of $S_{1,i}$ and $S_{4,i}$, $C_{S1,i}$ and $C_{S4,i}$, and the leakage inductance of the transformer $L_{l,i}$ form a resonant circuit. $S_{Au,i}$ will be turned off with zero current and zero voltage, when the diode $D_{Au,i}$ conducts. This stage ends when $D_{Au,i}$ turns off with zero current.

$$i_{S,i} = \frac{(v_{S,i}-v_{P,i})C_{r,i}L_{l,i}^2}{(L_i+L_{l,i})\sqrt{C_{r,i}\Phi_i(L_i+L_{l,i})}}\sin\omega_{11,i}t + \quad (32)$$
$$\frac{L_{l,i}I_{L10,i}}{L_i+L_{l,i}}\cos\omega_{11,i}t - \frac{v_{P,i}-v_{S,i}}{L_i+L_{l,i}}t + \frac{L_iI_{L10,i}}{L_i+L_{l,i}},$$

$$i_{Cr,i} = \frac{(v_{S,i}-v_{P,i})L_{l,i}C_{r,i}}{\sqrt{C_{r,i}\Phi_i(L_i+L_{l,i})}}\sin\omega_{11,i}t + I_{L10,i}\cos\omega_{11,i}t,$$

$$i_{S2,i} = i_{S3,i} = \frac{(v_{P,i}-v_{S,i})C_{r,i}L_iL_{l,i}}{(L_i+L_{l,i})\sqrt{C_{r,i}\Phi_i(L_i+L_{l,i})}}\sin\omega_{11,i}t -$$
$$\frac{L_iI_{L10,i}}{L_i+L_{l,i}}\cos\omega_{11,i}t - \frac{v_{P,i}-v_{S,i}}{L_i+L_{l,i}}t + \frac{L_iI_{L10,i}}{L_i+L_{l,i}},$$

$$i_{S1,i} = i_{S4,i} = 0$$

$$v_{Cr,i} = \quad (33)$$
$$I_{L10,i}Z_{o10,i}\sin\omega_{11,i}t - \frac{(v_{S,i}-v_{P,i})L_{l,i}}{L_i+L_{l,i}}\cos\omega_{11,i}t + \frac{L_iv_{P,i}+L_{l,i}v_{S,i}}{L_i+L_{l,i}},$$

$$v_{S2,i} = v_{S3,i} = 0$$

where $I_{L10,i}$ is the input current at $t_{10}$, $\omega_{11,i}=\omega_{5,i}$, $Z_{o11,i}=Z_{o5,i}$, and $\Phi_i=L_{r,i}L_i+L_{r,i}L_{l,i}+L_iL_{l,i}$.

The duration of this stage $\Delta t_{11,i}=t_{11}-t_{10}$ is equal to $\Delta t_{5,i}$.

12) Stage 12 [$t_{11}$-$t_{12}$] [FIG. 5(l)]: Inductor Discharging Stage

The energy stored in $L_i$ releases to the output together with the input at a relatively constant current. This stage ends when $S_{1,i}$ is turned on with zero current.

$$i_{S,i} = \frac{v_{S,i}-v_{P,i}}{L_i}t + I_{L11,i}, \quad (34)$$

$$i_{Cr,i} = 0,$$

$$i_{S2,i} = i_{S3,i} = \frac{v_{S,i}-v_{P,i}}{L_i}t + I_{L11,i},$$

$$i_{S1,i} = i_{S4,i} = 0$$

$$v_{Cr,i} = V_{C0,i}, v_{S2,i} = v_{S3,i} = 0 \quad (35)$$

where $I_{L11,i}$ is the input current at $t_{11}$.

The duration of this stage $\Delta t_{12,i}=t_{12}-t_{11}$ is equal to $\Delta t_{6,i}$. This completes a cycle of operation.

For the sake of simplicity in the following analysis of steady-state conditions, the input inductor current $i_{S,i}$ is assumed to be constant throughout the whole period. This is valid because the ripple current is very small, as compared with the average of $i_{S,i}$.

A. Voltage Conversion Ratio

The voltage conversion ratio is derived by considering the current $i_{o,i}$ on the primary side of the transformer. FIG. 7 shows the waveform of $i_{o,i}$. The electric energy is transferred from the primary side to the secondary in three main intervals in one-half of the switching period. Consider the first half cycle from $t_0$ to $t_6$. The intervals are as follows:

1) Stage 5—Based on (13), $i_{o,i}$ can be expressed as $$i_{o,i}=i_{S,i}-i_{S,i}\cos\omega_{5,i}t \quad (36)$$

The duration of this interval $\Delta t_5$ is shown in (15).

2) Stage 6—$i_{o,i}=i_{S,i}$. The duration of this interval $\Delta t_{6,i}$ is shown in (20).

3) Stage 7—$i_{o,i}$ decreases linearly, as expressed in (22), $$i_{o,i} = -\frac{v_{P,i}}{L_{l,i}}t + i_{S,i} \quad (37)$$

The duration of this interval $\Delta t_{7,i}$ is determined by solving (37) for $i_{o,i}=0$. Thus, $$\Delta t_{7,i} = t_7 - t_6 = \frac{L_{l,i}i_{S,i}}{v_{P,i}} \quad (38)$$

Thus, the area under $i_{o,i}$ is equal to $$A_{P,i} = \int_0^{\Delta t_{5,i}}[i_{S,i}-i_{S,i}\cos\omega_{5,i}t]dt + \quad (39)$$
$$\int_0^{\Delta t_{6,i}}i_{S,i}dt + \int_0^{\Delta t_{7,i}}\left(-\frac{v_{P,i}}{L_{l,i}}t + i_{S,i}\right)dt$$
$$= i_{S,i}\left(\theta_i\frac{T_S}{2}\right) + i_{S,i}\sqrt{C_{r,i}(L_{r,i}+L_{l,i})} + \frac{1}{2}\left(\frac{L_{l,i}i_{S,i}^2}{v_{P,i}}\right)$$

The average output current $I_{o,i}$ of the module is equal to $$I_{o,i} = \frac{2}{T_S}\frac{n_i}{n_o}A_P \quad (40)$$
$$= i_{S,i}\frac{n_i}{n_o}\left[\theta_i + \frac{2}{T_S}\sqrt{C_{r,i}(L_{r,i}+L_{l,i})} + \frac{1}{T_S}\left(\frac{L_{l,i}i_{S,i}}{\frac{n_i}{n_o}V_{Out}}\right)\right]$$

For N modules, the total output current $I_o$ is equal to the sum of all module outputs. Thus, $$I_o = \sum_{i=1}^{N} I_{o,i} \qquad (41)$$

$$= \sum_{i=1}^{N} i_{S,i} \frac{n_i}{n_o} \left[ \theta_i + \frac{2}{T_S} \sqrt{C_{r,i}(L_{r,i} + L_{l,i})} + \frac{1}{T_S} \left( \frac{L_{l,i} i_{S,i}}{\frac{n_i}{n_o} V_{Out}} \right) \right]$$

By using the conservation of energy, the voltage conversion ratio can be shown to be $$i_{S,i} V_{S,i} = i_o V_{Out} \qquad (42)$$

$$\Rightarrow \frac{V_{Out}}{V_{S,i}}$$

$$= \frac{n_o}{n_i} \frac{1 - \frac{L_{l,i} i_{S,i}}{T_S v_{S,i}}}{\theta_i + \frac{2}{T_S} \sqrt{C_{r,i}(L_{r,i} + L_{l,i})}}$$

Thus, the output voltage can be controlled by adjusting the value of $\theta_i$, which is the phase shift between the two switch pairs.

B. Selection of $L_{l,i}$, $C_{r,i}$, and $L_{r,i}$

1. $L_{l,i}$ $L_{l,i}$ is used to achieve ZCS of the two high side switches. The maximum value of $L_{l,i}$, $L_{l(max),i}$, determines the critical ZCS condition in stages 1 or 7 at the maximum power $P_{max,i}$. By using (2), it can be shown that $$L_{l(max),i} = \frac{n_i V_{Out} v_{S,i} \Delta t_{1,i}}{n_o P_{max,i}} \qquad (43)$$

where $i_{S(max),i}$ is the maximum value of $i_{S,i}$.

The duration of $\Delta t_{1,i}$ is an adjustable variable in the circuit implementation. It is practically determined by the controller integrated circuit [10]. Thus, the output power can be increased by increasing $\Delta t_{1,i}$—the overlap time of the two high side switches.

2. $C_{r,i}$ and $L_{r,i}$

The minimum value of $C_{r,i}$ is determined by ensuring the ZCS conditions for the two low side switches in stages 3 or 9 at the minimum power $P_{min,i}$. The durations $\Delta t_{3,i}$ or $\Delta t_{9,i}$ are equal to $\pi/2\omega_{3,i}$. Thus, by using (7), $$\Delta t_{3,i} = \pi/2\omega_{3,i} = \pi/2\sqrt{C_{r,i}L_{r,i}} \qquad (44)$$

By assuming $I_{L4,i} = i_{S(min),i}$ and using (16) and (6), $$-\frac{V_{C0,i}}{Z_{o3,i}} = i_{S,(min),i} \qquad (45)$$

$$\Rightarrow C_{r,i}$$

$$= \left[ \frac{\left( \sqrt{L_{l,i} + L_{r,i}} - \sqrt{L_{r,i}} \right) i_{S(min),i}}{v_{P,i}} \right]^2$$

where $i_{S(min),i}$ is the value of $i_{S,i}$ at the minimum input power. By solving (44) and (45) for $C_{r,i}$ and $L_{r,i}$, it can be shown that $$C_{r,i} = \frac{n_o P_{min}}{n_i V_{out} v_{s,i}} \left[ L_{l,i} \left( \frac{n_o P_{min}}{n_i V_{out} v_{s,i}} \right) - 2 \left( \Delta t_{3,i} \frac{2}{\pi} \right) \right] \qquad (46)$$

and $$L_{r,i} = \frac{\left( \frac{n_i V_{Out} v_{s,i}}{n_o P_{min}} \Delta t_{3,i} \frac{2}{\pi} \right)^2}{L_{l,i} - 2 \frac{n_i V_{Out} v_{s,i}}{n_o P_{min}} \left( \Delta t_{3,i} \frac{2}{\pi} \right)} \qquad (47)$$

According to (45), in order to ensure a positive value of $C_{r,i}$, the value of $L_{l,i}$ has to satisfy the following constraint of $$L_{l,i} > L_{l(min),i} = 2 \frac{n_i V_{Out} v_{s,i}}{n_o P_{min}} \left( \Delta t_{3,i} \frac{2}{\pi} \right) \qquad (48)$$

As shown in (46), the value of $C_{r,i}$ increases with the increase in the value of $L_{l,i}$ for a given power level.

C. Selection of the Transformer Turns-Ratio $n_o/n_i$

The transformer turns ratio is selected by considering the converter at the minimum power condition $P_{min}$. By rearranging (45), $$P_{min,i} = v_{S,i} i_{S(min),i} = \frac{v_{S,i} v_{P,i}}{Z_{o5,i} - Z_{o3,i}} \qquad (49)$$

Based on (42), the output power decreases as $\theta_i$ increases. By substituting (49) into (42) and eliminating $i_{S(min),i}$, it can be shown that $$\frac{n_i}{n_o} \left[ \theta_{i(max)} + \frac{2}{T_S} \sqrt{C_{r,i}(L_{r,i} + L_{l,i})} + \frac{1}{T_S} \left( \frac{L_{l,i}}{Z_{o5,i} - Z_{o3,i}} \right) \right] = \frac{v_{S,i}}{V_{Out}} \qquad (50)$$

where $\theta_{i(max)}$ is the maximum value of $\theta_i$ and is derived as follows.

$\theta_{i(max)}$ occurs when $\Delta t_{4,i}$ is close to zero. Thus, according to FIG. 6, $$\theta_{i(max)} \frac{T_S}{2} = \frac{T_S}{2} - \Delta t_{1,i} - \Delta t_{2,i} - \Delta t_{3,i} \qquad (51)$$

$\Delta t_{1,i}$, $\Delta t_{2,i}$, and $\Delta t_{3,i}$ are set by the external components in the phase-shift controller, such as UC3875. By substituting (51) into (50), the maximum turns ratio $\mu_{max}$ is equal to $$\mu_{max} = \frac{n_o}{n_i} \bigg|_{max} = \eta \frac{2}{T_S} \left[ \theta_{max,i} + \frac{1}{\omega_{5,i}} + \frac{L_{l,i}}{2 \cdot (Z_{o5,i} - Z_{o3,i})} \right] \qquad (52)$$

FIG. 8 illustrates one example of a suitable control circuit 800 for the auxiliary circuit 220 shown in FIG. 3. As shown in FIG. 8, the control circuit 800 includes a NOR gate $U_{4,i}$ for monitoring the overlapping period of switching gate signals $v_{GS3,i}$ and $v_{GS4,i}$. An LC filter network $R_{1,i}$ and $C_{1,i}$, together with a positive DC voltage $V_{DC3,i}$ and a comparator $U_{3,i}$, is used to determine the turn-on time of the auxiliary switch $S_{Au,i}$ during the overlapping period.

A current transformer $T_{C,i}$ with turns-ratio 1:n is connected in series in the auxiliary circuit, where n is a large integer such as 140. The current transformer is used to step down the current flowing through the auxiliary circuit. Resistor $R_{S,i}$ is a current sense resistor which is connected in series with the secondary winding of the current transformer.

The turn-on signal provided by the comparator $U_{3,i}$ cannot be maintained after the overlapping period. Therefore, comparators $U_{1,i}$, $U_{2,i}$, an RS latch $U_{5,i}$, and an OR gate $U_{6,i}$ are provided to maintain the turn-on signal $v_{GSAu,i}$ for the auxiliary switch $S_{Au,i}$ throughout Stages 3, 4 and 5.

The comparator $U_{1,i}$, which receives a positive DC voltage $V_{DC1,i}$, latches the output of the RS latch $U_{5,i}$ to Logic "1" when it detects the rising voltage across the current sense resistor $R_{S,i}$ during Stage 3. The OR gate $U_{6,i}$ combines the Logic "1" signals from the comparator $U_{3,i}$ and the RS latch $U_{5,i}$ to maintain the turn-on signal $v_{GSAu,i}$ high. When the signal from the comparator $U_{3,i}$ changes to a Logic "0" during Stage 4, the output of the RS latch $U_{5,i}$ maintains the turn-on signal $v_{GSAu,i}$ high to keep the auxiliary switch $S_{Au,i}$ on.

The comparator $U_{2,i}$, which receives a negative DC voltage $-V_{DC2,i}$, is used to remove the gate signal $v_{GSAu,i}$ when the body diode of the auxiliary switch $S_{Au,i}$ conducts at Stage 5. When the comparator $U_{2,i}$ detects the negative voltage across the current sense resistor $R_{S,i}$, it resets the RS-latch $U_{5,i}$ to Logic "0," which causes the output of the OR gate to become low so that the auxiliary switch $S_{Au,i}$ is turned off when its body diode is conducting.

The invention claimed is:

1. A multi-input dc/dc converter comprising:
a plurality of input modules, each input module including at least one input terminal for coupling to a separate dc power source and a full bridge converter having four main switches;
a transformer having a plurality of primary windings and at least one secondary winding, each primary winding coupled to one of the full bridge converters;
at least one output terminal for supplying dc power to a load; and
a rectifier circuit coupled between the secondary winding of the transformer and said output terminal;
each input module further including an auxiliary circuit coupled in parallel with the full bridge converter, the auxiliary circuit configured to achieve turn-on and turn-off of the four main switches when there is substantially no current flowing through each switch being turned on or turned off.

2. The converter of claim 1 wherein the auxiliary circuit of each input module is coupled to an input side of the full bridge converter.

3. The converter of claim 1 wherein each input module further includes an input choke coupled between said input terminal and the full bridge converter.

4. The converter of claim 3 wherein each auxiliary circuit includes an auxiliary switch having a body diode that inhibits current flow from the input choke when the auxiliary switch is off.

5. The converter of claim 1 wherein each full bridge converter is a phase-shift-controlled full bridge converter.

6. The converter of claim 1 wherein each auxiliary circuit includes a switch, a capacitance, and an inductance.

7. The converter of claim 6 wherein said switch, said capacitance, and said inductance are coupled in series in each input module.

8. The converter of claim 1 wherein each auxiliary circuit includes an auxiliary switch and is configured to achieve substantially zero-current-switching of the auxiliary switch during turn-on and substantially zero-voltage-switching of the auxiliary switch during turn-off.

9. The converter of claim 8 wherein each auxiliary circuit includes a control circuit for controlling said auxiliary circuit switch.

10. The converter of claim 9 wherein each auxiliary circuit includes a current transformer coupled to said control circuit.

11. The converter of claim 1 wherein the four main switches are each configured for unidirectional operation.

12. A multi-input DC/DC converter comprising:
a plurality of input modules, each input module including at least one input terminal for coupling to a separate dc power source, a full bridge converter having four main switches, and means for achieving turn-on and turn-off of the four main switches when there is substantially no current flowing through each switch being turned on or turned off;
a transformer having a plurality of primary windings and at least one secondary winding, each primary winding coupled to one of the full bridge converters;
at least one output terminal for supplying dc power to a load; and
a rectifier circuit coupled between the secondary winding of the transformer and said output terminal.

13. The converter of claim 12 wherein said means for achieving turn-on and turn-off of the four main switches in each input module includes a switch, a capacitance, and an inductance coupled to an input side of the full bridge converter.

14. The converter of claim 7 wherein each input module includes an input choke coupled between its input terminal and its full bridge converter and wherein the switch of each auxiliary circuit includes a body diode that inhibits current flow from the input choke when the auxiliary switch is off.

15. The converter of claim 14 wherein each main switch is coupled is series with a blocking diode.

16. The converter of claim 15 wherein each auxiliary circuit is configured to achieve substantially zero-current-switching of the auxiliary switch during turn-on and substantially zero-voltage-switching of the auxiliary switch during turn-off.

17. The converter of claim 16 wherein each full bridge converter is a phase-shift-controlled full bridge converter.

* * * * *